(12) United States Patent
Arrieta-Prieto et al.

(10) Patent No.: US 12,328,000 B2
(45) Date of Patent: Jun. 10, 2025

(54) SPATIO-TEMPORAL PROBABILISTIC FORECASTING OF WIND POWER OUTPUT

(71) Applicant: RENSSELAER POLYTECHNIC INSTITUTE, Troy, NY (US)

(72) Inventors: Mario Arrieta-Prieto, Bogata (CO); Kristen R. Schell, Pittsford, NY (US)

(73) Assignee: RENSSELAER POLYTECHNIC INSTITUTE, Troy, NY (US)

( * ) Notice: Subject to any disclaimer, the term of this patent is extended or adjusted under 35 U.S.C. 154(b) by 350 days.

(21) Appl. No.: 17/642,787

(22) PCT Filed: Sep. 14, 2020

(86) PCT No.: PCT/US2020/050612
§ 371 (c)(1),
(2) Date: Mar. 14, 2022

(87) PCT Pub. No.: WO2021/051035
PCT Pub. Date: Mar. 18, 2021

(65) Prior Publication Data
US 2022/0407352 A1    Dec. 22, 2022

Related U.S. Application Data

(60) Provisional application No. 63/077,188, filed on Sep. 11, 2020, provisional application No. 62/899,846, filed on Sep. 13, 2019.

(51) Int. Cl.
*H02J 13/00* (2006.01)
*H02J 3/38* (2006.01)

(52) U.S. Cl.
CPC ........ *H02J 13/00022* (2020.01); *H02J 3/381* (2013.01); *H02J 2203/20* (2020.01); *H02J 2300/28* (2020.01)

(58) Field of Classification Search
CPC .. H02J 13/00022; H02J 3/381; H02J 2203/20; H02J 2300/28; Y02E 10/76;
(Continued)

(56) References Cited

U.S. PATENT DOCUMENTS 6,963,802 B2   11/2005   Enis et al.
7,308,361 B2   12/2007   Enis et al.
(Continued)

FOREIGN PATENT DOCUMENTS

CN    103136913 A    6/2013

OTHER PUBLICATIONS

Wolf Peter Jean Phillippe, "Mixed Copula-Based Uncertainty Modeling of Hourly Wind Farm Production for Power System Operational Planning Studies", Jul. 6, 2020, IEEE Access, vol. 8, 2020 (Year: 2020).*

(Continued)

*Primary Examiner* — Christopher W Carter
(74) *Attorney, Agent, or Firm* — Barclay Damon LLP

(57) ABSTRACT

A method for forecasting wind power output of a target wind farm. The method includes normalizing, wind power output data for each wind farm of a group of wind farms, based, at least in part, on a respective installed capacity; transforming, the normalized power output data to yield transformed normalized wind power output data. Fitting, by the temporal module, each temporal model of at least one temporal model to model input data for each wind farm. The model input data corresponds to normalized wind power output data or transformed normalized wind power output data. The method further includes fitting, by a spatial module, a DVINE copula model for the group of wind farms, based, at least in part, on at least one residual value. Each residual value is determined based, at least in part on a selected fitted temporal model for each wind farm in the group.

15 Claims, 2 Drawing Sheets

(58) Field of Classification Search
CPC ....... Y02E 40/70; Y02E 60/00; Y04S 10/123; Y04S 40/126; Y04S 40/20
See application file for complete search history.

(56) References Cited

U.S. PATENT DOCUMENTS

| | | | |
|---|---|---|---|
| 7,974,742 | B2 | 7/2011 | Enis et al. |
| 8,076,789 | B2 | 12/2011 | Miller |
| 8,200,435 | B2 | 6/2012 | Stiesdal |
| 8,620,634 | B2 | 12/2013 | Foslien Graber et al. |
| 9,097,236 | B2 | 8/2015 | Zhou et al. |
| 9,460,478 | B2 | 10/2016 | Zhang et al. |
| 9,489,701 | B2 | 11/2016 | Emadi et al. |
| 9,606,518 | B2 | 3/2017 | Evans et al. |
| 9,690,884 | B2 | 6/2017 | Guzman et al. |
| 10,041,475 | B1 | 8/2018 | Badrinath Krishna et al. |
| 10,138,873 | B2 | 11/2018 | Gregg et al. |
| 10,181,101 | B2 | 1/2019 | Zhang et al. |
| 10,260,481 | B2 | 4/2019 | Wilson et al. |
| 10,309,372 | B2 | 6/2019 | Huyn et al. |
| 2010/0127495 | A1 | 5/2010 | Egedal et al. |
| 2012/0046917 | A1 | 2/2012 | Fang et al. |
| 2016/0049792 | A1* | 2/2016 | Burra ........................ H02J 3/50 307/52 |
| 2016/0195576 | A1 | 7/2016 | Hurri et al. |
| 2016/0239749 | A1 | 8/2016 | Peredriy et al. |
| 2017/0017882 | A1 | 1/2017 | He et al. |
| 2018/0223812 | A1 | 8/2018 | Badrinath Krishna et al. |

OTHER PUBLICATIONS

Jethro Dowell, "Very-Short-Term Probabilistic Wind Power Forecasts by Sparse Vector Autoregression", Mar. 2016, IEEE, Transactions on Smart Grid, vol. 7, No. 2 (Year: 2016).*

Jinghua Li, "Copula-function-based method for acquiring relevant characteristic of wind power plant capacity" (ip.com English machine translation), Apr. 3, 2013, ip.com machine translations (Year: 2013).*

International Search Report and The Written Opinion of the International Searching Authority, International Application No. PCT/US2020/050612, mailed Dec. 16, 2020.

Veeramachaneni, K., et al., "Copula Graphical Models for Wind Resource Estimation," Twenty-Fourth International Joint Conference on Artificial Intelligence, pp. 2646-2654, Jul. 2015.

* cited by examiner

SPATIO-TEMPORAL PROBABILISTIC FORECASTING OF WIND POWER OUTPUT

CROSS REFERENCE TO RELATED APPLICATION(S)

This application claims the benefit of U.S. Provisional Application No. 62/899,846, filed Sep. 13, 2019, and U.S. Provisional Application No. 63/077,188, filed Sep. 11, 2020, which are incorporated by reference as if disclosed herein in their entireties.

FIELD

The present disclosure relates to forecasting, in particular to, spatio-temporal probabilistic forecasting of wind power output.

BACKGROUND

Appropriate utilization and network integration of wind power relies on accurate forecasting of power output of this renewable energy source. Probabilistic forecasting mechanisms for renewable energy sources are configured to ensure that the introduction of these alternative sources in the power supply system is done in an efficient way. Reliable wind power forecasts for the short term allow decision makers to establish optimal action plans to meet the market demand while reducing the use of nonrenewable fuels.

Wind power may be modeled as a stochastic process. Wind power data pose particular challenges for traditional probabilistic forecasting due to the features of the associated stochastic process. Such features may include, but are not limited to, (1) nonstationary and possibly nonlinear temporal dynamics; (2) boundedness/censoring, i.e., confinement of the data to a finite-length interval; (3) high observation frequency; and (4) asymmetric spatial dependency resulting from a changing wind direction when considering a plurality of wind farms.

SUMMARY

In some embodiments, there is provided a method for forecasting wind power output of a target wind farm. The method includes normalizing, by a preprocessor module, wind power output data for each wind farm of a group of wind farms, based, at least in part, on a respective installed capacity; transforming, by a temporal module, the normalized power output data to yield transformed normalized wind power output data. The method further includes fitting, by the temporal module, each temporal model of at least one temporal model to model input data for each wind farm. The model input data corresponds to normalized wind power output data or transformed normalized wind power output data. The method further includes fitting, by a spatial module, a DVINE copula model for the group of wind farms, based, at least in part, on at least one residual value. Each residual value is determined based, at least in part on a selected fitted temporal model for each wind farm in the group.

In some embodiments, the method further includes adjusting, by the temporal module, at least one model parameter based, at least in part, on a model residual and based, at least in part on a support vector regression (SVR) hybridization.

In some embodiments of the method, the temporal model is selected from the group including Naïve—ARIMAX, Transformed ARIMAX, Transformed dynamic autoregressive (AR), quantile AR, dummy and persistence. The ARIMAX models correspond to an autoregressive integrated moving average and includes an additive cyclic feature. The transformed models correspond to application of a u-logit transform.

In some embodiments, the method further includes validating, by a validation module, each model of the at least one model, the validating including at least one of a univariate validation technique and a multivariate validation technique.

In some embodiments of the method, the univariate validation technique is selected from the group including a probability integral transformation, an exceedance calibration, a marginal calibration, a continuous-ranked probability score and the multivariate validation technique is selected from the group including evaluating a pre-rank function and determining an energy score.

In some embodiments, the method further includes selecting, by the validation module, at least one selected temporal model based, at least in part, on a comparison of validation results.

In some embodiments, the method further includes acquiring, by the preprocessor module, wind farm data, the wind farm data including the power output data, geographic location data, and weather data, the weather data including one or more of wind direction, wind speed, air temperature, air density and air pressure.

In some embodiments, there is provided a wind power output forecasting system for a target wind farm. The system includes a preprocessor module, a temporal module, and a spatial module. The preprocessor module is configured to normalize wind power output data for each wind farm of a group of wind farms, based, at least in part, on a respective installed capacity. The temporal module is configured to transform the normalized power output data to yield transformed normalized wind power output data. The temporal module is further configured to fit each temporal model of at least one temporal model to model input data for each wind farm. The model input data corresponds to normalized wind power output data or transformed normalized wind power output data. The spatial module is configured to fit a DVINE copula model for the group of wind farms, based, at least in part, on at least one residual value. Each residual value is determined based, at least in part on a selected fitted temporal model for each wind farm in the group.

In some embodiments of the system, the temporal module is further configured to adjust at least one model parameter based, at least in part, on a model residual and based, at least in part on a support vector regression (SVR) hybridization.

In some embodiments of the system, the temporal model is selected from the group including Naïve-ARIMAX, Transformed ARIMAX, Transformed dynamic autoregressive (AR), quantile AR, dummy and persistence. The ARIMAX models correspond to an autoregressive integrated moving average and includes an additive cyclic feature. The transformed models correspond to application of a υ-logit transform.

In some embodiments, the system further includes a validation module configured to validate each model of the at least one model. The validating includes at least one of a univariate validation technique and a multivariate validation technique. The univariate validation technique is selected from the group including a probability integral transformation, an exceedance calibration, a marginal calibration, a continuous-ranked probability score. The multivariate validation technique is selected from the group including evaluating a pre-rank function and determining an energy score.

In some embodiments of the system, the validation module is further configured to select at least one selected temporal model based, at least in part, on a comparison of validation results.

In some embodiments of the system, the preprocessor module is further configured to acquire wind farm data. The wind farm data includes the power output data, geographic location data, and weather data. The weather data includes one or more of wind direction, wind speed, air temperature, air density and air pressure.

In some embodiments, there is provided a computer readable storage device having stored thereon instructions that when executed by one or more processors result in the following operations including: normalizing wind power output data for each wind farm of a group of wind farms, based, at least in part, on a respective installed capacity; transforming the normalized power output data to yield transformed normalized wind power output data; and fitting each temporal model of at least one temporal model to model input data for each wind farm. The model input data corresponds to normalized wind power output data or transformed normalized wind power output data. The operations further include fitting a DVINE copula model for the group of wind farms, based, at least in part, on at least one residual value. Each residual value is determined based, at least in part on a selected fitted temporal model for each wind farm in the group.

In some embodiments of the device, the instructions that when executed by one or more processors result in the following additional operations including: adjusting at least one model parameter based, at least in part, on a model residual and based, at least in part on a support vector regression (SVR) hybridization.

In some embodiments of the device, the temporal model is selected from the group including Naïve-ARIMAX, Transformed ARIMAX, Transformed dynamic autoregressive (AR), quantile AR, dummy and persistence. The ARIMAX models correspond to an autoregressive integrated moving average and include an additive cyclic feature. The transformed models correspond to application of a $\upsilon$-logit transform.

In some embodiments of the device, the instructions that when executed by one or more processors result in the following additional operations including: validating each model of the at least one model, the validating including at least one of a univariate validation technique and a multivariate validation technique.

In some embodiments of the device, the univariate validation technique is selected from the group including a probability integral transformation, an exceedance calibration, a marginal calibration, a continuous-ranked probability score and the multivariate validation technique is selected from the group including evaluating a pre-rank function and determining an energy score.

In some embodiments of the device, the instructions that when executed by one or more processors result in the following additional operations including: selecting at least one selected temporal model based, at least in part, on a comparison of validation results.

In some embodiments of the device, the instructions that when executed by one or more processors result in the following additional operations including: acquiring wind farm data, the wind farm data including the power output data, geographic location data, and weather data, the weather data including one or more of wind direction, wind speed, air temperature, air density and air pressure.

BRIEF DESCRIPTION OF DRAWINGS

The drawings show embodiments of the disclosed subject matter for the purpose of illustrating features and advantages of the disclosed subject matter. However, it should be understood that the present application is not limited to the precise arrangements and instrumentalities shown in the drawings, wherein.

Figure 1:
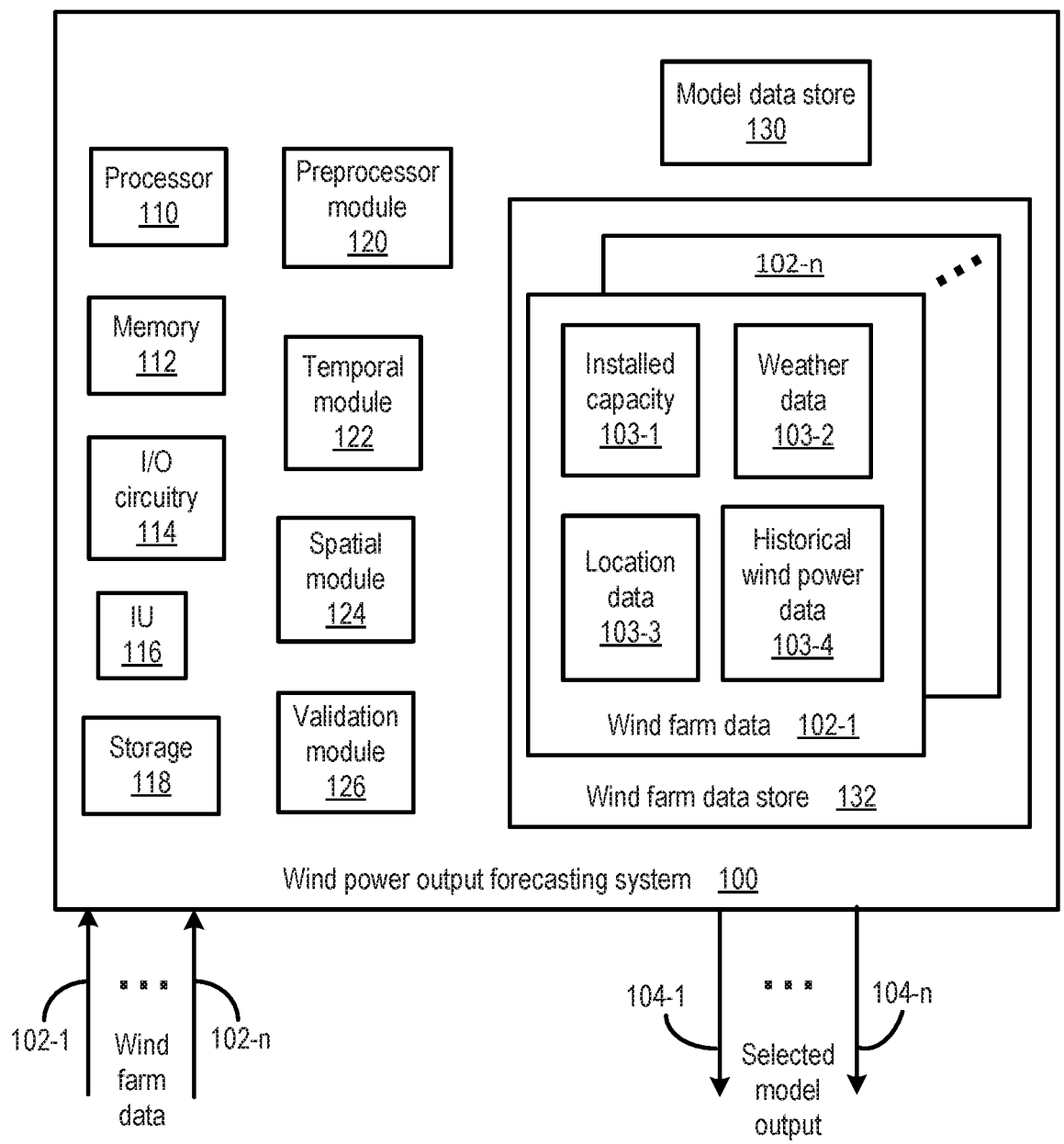
FIG. 1 illustrates a functional block diagram of a system for spatio-temporal probabilistic forecasting of wind power, according to several embodiments of the present disclosure.

Although the following Detailed Description will proceed with reference being made to illustrative embodiments, many alternatives, modifications, and variations thereof will be apparent to those skilled in the art.

DETAILED DESCRIPTION

Generally, this disclosure relates to a method and system for spatio-temporal probabilistic forecasting of wind power output. The forecasting method and/or system are configured to identify a model for forecasting wind power output with a forecast horizon in the range of about one hour to about 120 hours. The forecasting method and/or system are configured to acquire wind farm data from at least one wind farm. As used herein, a "wind farm" is a site (i.e., a geographic location) that includes one or more wind turbine (s) configured to generate electricity from wind. Each wind farm of a plurality of wind farms is configured to have a respective installed capacity. The installed capacity corresponds to a design maximum power output and may vary across a plurality of wind farms. Wind farm data for each wind farm includes, but is not limited to, installed capacity, historical power output data (i.e., wind farm power output captured over time), geographic location data, and weather data (historical and current). Weather data may include, but is not limited to, wind direction, wind speed, air temperature, air density and air pressure. The weather data may include historical data (captured as a function of time), current data and/or forecasted weather data.

Generally, the forecasting method and/or system are configured to fit a plurality of temporal models to at least a portion of wind farm data for each wind farm. The forecasting method and/or system are then configured to fit a spatial model (e.g., drawable vine ("DVINE") structure) based, at least in part, on residuals from the temporal model fitting. The spatio-temporal models may then be validated for each wind farm and at least one respective spatio-temporal model may be selected for each wind farm based, at least in part, on validation results.

Using the DVINE copula to model the spatial dependence in the residuals of a set of temporal models, as described herein, is configured to be relatively computationally efficient. Pairing a spatial dependence structure (DVINE) model with a model containing a temporal component may then relatively accurately describe the spatio-temporal dynamics of the phenomenon and provide adequate probabilistic forecasts.

The forecasting method and/or system are configured to normalize power output data from each wind farm based, at least in part, on installed capacity. In some embodiments, the normalized power output data may be split into a training portion and a testing portion. Training operations including, for example, model fitting, may then be performed on the training portion and validation operations, for example, may be performed using the testing portion. In some embodiments, the normalized power output data may be transformed with the transformation configured to expand a range of the normalized power output data and/or to account for heteroscedasticity in the normalized power output data. Model input data may then correspond to the normalized power output data or the transformed normalized power output data.

Each of a plurality of probabilistic models may then be fitted to the model input data for each wind farm. Model fitting includes estimating one or more model parameters based, at least in part, on the model input data and based, at least in part, on an error function. In some embodiments, the model fitting may consider a weather covariate, i.e., one or more element of weather data. As a result of the model fitting, a respective set of fitted models with a respective set of model parameter values for each model in the set of fitted models, may be associated with each wind farm. In some embodiments, one or more models may be complemented by a formalized model for a corresponding residual process. In one nonlimiting example, the model complementing residual process corresponds to a support vector regression (SVR) hybridization. Residual values may then correspond to model residual values from each model or hybridized residual values for each model.

The forecasting method and/or system may then be configured to generate a linear spanning tree and to fit a DVINE copula model based, at least in part, on the residual values from the temporal models over a group of wind farms. The DVINE copula model is configured to relate a wind power output of each of a plurality of wind farms at a point in time.

An ensemble of forecasts may then be generated for each wind farm and based, at least in part, on the temporal and spatial models associated with the respective wind farm. A univariate validation may then be performed on each temporal model and a multi-variate validation may be performed on the spatial models for each wind farm. The validation operations may be performed based, at least in part, on the testing portion of the normalized wind power output data. A relatively most adequate model may then be selected based, at least in part, on the validation results. The selected model may then be used to forecast wind power output for the associated wind farm based, at least in part, on element(s) of current and/or forecast weather data.

FIG. 1 illustrates a functional block diagram of a system 100 for spatio-temporal probabilistic forecasting of wind power consistent with several embodiments of the present disclosure. System 100 is configured to receive wind farm data 102-1, ..., 102-n from a plurality of wind farms and to provide as output a respective selected model output 104-1, ..., 104-n for each wind farm. Each selected model output may include a selected model identifier and associated probabilistic information.

System 100 may include, but is not limited to, a computing system (e.g., a server, a workstation computer, a desktop computer, a laptop computer, a tablet computer, an ultraportable computer, an ultramobile computer, a netbook computer and/or a subnotebook computer, etc.), and/or a smart phone. System 100 includes a processor 110, a memory 112, input/output (I/O) circuitry 114, a user interface (UI) 116, and storage 118. System 100 may further include a preprocessor module 120, a temporal module 122, a spatial module 124, and a validation module 126. System 100 may further include a model data store 130, and a wind farm data store 132.

Processor 110 may include one or more processing units and is configured to perform operations of system 100, e.g., operations of preprocessor module 120, temporal module 122, spatial module 124, and validation module 126. Memory 112 may be configured to store data associated with preprocessor module 120, temporal module 122, spatial module 124, and validation module 126. I/O circuitry 114 may be configured to communicate wired and/or wirelessly with a source of wind farm data 102-1, ..., 102-n and/or a recipient of selected model output 104-1, ..., 104-n. UI 116 may include a user input device (e.g., keyboard, mouse, microphone, touch sensitive display, etc.) and/or a user output device, e.g., a display. Storage 118 is configured to store model data 130 and/or wind farm data 132.

In operation, preprocessor module 120 may be configured to acquire wind farm data 102-1, ..., 102-n. The wind farm data 102-1, ..., 102-n may be acquired from one or more wind farms and/or a repository of wind farm data. The wind farm data 102-1, ..., 102-n may then be stored to the wind farm data store 132. The wind farm data, e.g., wind farm data 102-1, may include one or more of installed capacity 103-1, weather data 103-2, location data 103-3 and historical wind power output data 103-4, as described herein. The wind farm data for each wind farm may be associated with a respective wind farm identifier in wind farm data store 132.

Preprocessor module 120 may be configured to normalize the acquired power output data for each wind farm by dividing each power output value by the installed capacity of the corresponding wind farm. The normalized power output data may then be in the range of 0 to 1, inclusive, i.e., may be included in the interval [0, 1]. In some embodiments, the preprocessor module 120 may be configured to split the wind farm data and the normalized power output data into a training data set and a testing data set. In one nonlimiting example, the data may be split 70/30% with 700% corresponding to the training data set and 30% corresponding to the testing data set. However, this disclosure is not limited in this regard. The training portion may then be used for identifying and calibrating a plurality of spatio-temporal models, and the testing portion may be used for assessing the predictive accuracy of the proposed models.

In some embodiments, the range of normalized power output data may be expanded via a transformation. For example, the temporal module 122 may be configured to apply a generalized logit (u-logit) transformation to the normalized power output data and the interval [0, 1] may thus be expanded to $(-\infty, +\infty)$. Additionally or alternatively, the u-logit transformation may accommodate heteroscedasticity related to a functional relationship between a mean ($\mu_t$) and a standard deviation ($\sigma_t$) in the normalized power output data over time of type:

$$\sigma_t \propto \frac{1}{\upsilon}\mu_t \cdot (1 - \mu_t^\upsilon), \upsilon > 0$$

The $\upsilon$ parameter is configured to manage an amount of asymmetry in the normalized power output data. For example, for a site i, a time series (i.e., sampled at a time interval) of normalized power output data, $\{Y_{i,t}\}$, that has been transformed according to the generalized logit transform may be written as:

$$X_{i,t} := \text{logit}(Y_{i,t}; v_{(i)}) := \log\left(\frac{Y_{i,t}^{v_{(i)}}}{1 - Y_{i,t}^{v_{(i)}}}\right)$$

where $v_{(i)}$ corresponds to the power for site i and $\text{logit}^{-1}(\bullet; v_{(i)})$ corresponds to an inverse logit transformation. For example, $v_{(i)}$ may be calibrated using a mean squared error (MSE) of a one-step-ahead point prediction over a portion (e.g., 30%) of the training data set for each temporal model that is fitted to transformed data. In another example, $v_{(i)}$ may be calibrated using a minimum average continuous-ranked probability score (CRPS) for probabilistic predictions for each temporal model that is fitted to transformed data. Thus, an appropriate transformation for normalized power output data bay be determined for each wind farm. It may be appreciated that, in some situations, the appropriate transformation may be no transformation.

It may be appreciated that the logit transformation is not well-defined at the boundaries of the normalized power output data. The boundaries of the normalized power output data correspond to zero power output or power output greater than or equal to design capacity. To accommodate use of the logit transformation, a value, $\eta$, may be imputed for the lower boundary, a value $1-\eta$ may be imputed for the upper boundary and Gaussian white noise with a relatively small variance (e.g., $\sigma_\eta^2 \sim 10^{-8}$) may be included in the imputation process performed by the temporal module 122. In one nonlimiting example, $\eta$ is on the order of $10^{-4}$. However, this disclosure is not limited in this regard.

As used herein, $X_{i,t}$ corresponds to model input data. Thus, $X_{i,t}$ may correspond to transformed (i.e., u-logit transformed) normalized power output data or normalized power output data (i.e., $X_{i,t} := Y_{i,t}$, $\forall i, t$) that has not been transformed.

The temporal dynamics of each wind farm may be modeled based, at least in part, on the acquired wind farm data. Wind farm data may include, but is not limited to, installed capacity, weather data, location data and/or historical wind power record data. Weather data may include, for example, wind direction, wind speed, air temperature, air density, and/or air pressure. Location data may include or represent a geographic location indicator.

Table 1 includes a plurality of possible temporal models for wind farm power output. Table 1 includes a model label and an expression that defines the corresponding model. It may be appreciated that, in Table 1, $X_{i,t}$ corresponds to model input data and may thus correspond to transformed normalized power output data or normalized power output data, depending on the model. The models that are associated with the transformed normalized power output data are indicated by an asterisk in parentheses (*) in the Table 1. The temporal module 122 is configured to fit each of at least a portion of the temporal models listed in Table 1 to the respective training data set for each wind farm.

TABLE 1

| Temporal models | |
| --- | --- |
| Temporal model | Expression |
| Naïve - ARIMAX | $X_{i,t} = S_{i,t} + \tilde{X}_{i,t}$ <br> $\phi(B)\tilde{X}_{i,t} = \vartheta(B)\varepsilon_{i,t}$ |
| Transf. - ARIMAX (*) | $S_{i,t} = \sum_{k=1}^{K}\left\{\beta_{1k}\sin\left(\frac{2\pi kt}{M}\right) + \beta_{2k}\cos\left(\frac{2\pi kt}{M}\right)\right\}$ |

TABLE 1-continued

| Temporal models | |
| --- | --- |
| Temporal model | Expression |
| Transf. - dynAR (*) | $X_{i,t+\omega} = \Phi_{t+\omega}^T X_{i,\leq t} + \varepsilon_{i,t+\omega}$ |
| quantAR (*) | $q_{\alpha,t,h} = \Phi^T(\alpha)X_{i,\leq t} + S_{i,t}(\alpha)$ |
| Dummy | $X_{i,t} \sim U[0, 1] \forall i, t$ |
| Persistence | $X_{i,\hat{T}+h|\hat{T}} = x_{i,\hat{T}+h-\omega}$ w.p. 1, $1 \leq h \leq \omega$ |

Both the naive-ARIMAX and the transf.-ARIMAX models correspond to auto regressive integrated moving average (i.e., ARIMA) models. The "X" in the label ARIMAX is configured to indicate inclusion of sinusoidal, periodic patterns as covariates. The naive-ARIMAX model is configured to fit normalized power output data and the transf.-ARIMAX model is configured to fit transformed normalized power output data. Thus, naive-ARIMAX and transf.-ARIMAX differ in the application of the u-logit transformation. Both naive-ARIMAX and transf.-ARIMAX correspond to an ARIMA model with a deterministic seasonal component represented by the term $S_{i,t}$ and an additive component, $\tilde{X}_{i,t}$. The deterministic seasonal component is configured to accommodate yearly, quarterly, monthly, weekly and daily periodicity depending on the values of M and K. The additive component, $\tilde{X}_{i,t}$, may be described as an ARIMA process with operators $\phi(B)$ and $\vartheta(B)$. For transf.-ARIMAX, the prediction results may be mapped back to the [0, 1] interval using the inverse u-logit transformation. For naive-ARIMAX, the model may be fit directly to the normalized power output data (of the training data set). If a predicted value goes below 0 or above 1, the predicted value may be projected to the unit interval under a minimum distance criterion.

The transf.-DynAR model is configured to allow a vector of parameters in the autoregressive component, $\Phi_t$, to vary smoothly over time and may thus accommodate seasonality among other features. For the transf.-DynAR model, $X_{i,\leq t}$ corresponds to a vector of lagged (i.e., prior) observations up to the time t. A corresponding forecast may be targeted at a time instant t+ω. The parameter ω(=12, 24, . . . ) is configured to represent a leading forecasting ability of the model. A size of the vector, $X_{i,\leq t}$, i.e., the number of lags considered, may be determined via a cross-validation operation.

The quantAR model is configured to predict a number of quantiles of a corresponding predictive distribution using a quantile autoregression model. The quantAR model is configured to estimate a vector of parameters $\Phi(a)$ that uses the past realizations of the variable of interest as covariates to predict the a-quantile of the distribution of interest, $q_{\alpha,t,h}$, directly. The vector of parameters in the model changes according to the values of α, a lower-tail probability of interest, for the corresponding predictive density at t+h given the information up to time t. A cyclic feature similar to the one of the naive-ARIMAX and the transf.-ARIMAX may be introduced. The coefficient estimates may change depending on the value of α considered.

The Dummy model is configured to represent total uncertainty about future outcomes (disregarding the value of the past information in attempting to explain such uncertainty) by considering that the future densities are all uniform over the [0, 1] interval. The Persistence model assumes that the best prediction is the value observed ω steps before and is configured to disregard other source(s) of uncertainty.

The temporal module 122 may be configured to fit each temporal model from Table 1 to each of the at least one wind farm. The structural parameters may be selected to minimize the AICC (Corrected Akaike Information Criterion). The nonstructural parameters may be estimated via Generalized Least Squares (GLS).

In some embodiments, if weather covariates are available (e.g., one or more of wind speed, air temperature, air pressure, air density), the covariates may be included in an additive component of the trend for at least some of the models in Table 1 as:

$$\gamma^T z_t = \sum_{l=1}^{L} \gamma z_{lt}$$

with $z_t = (z_{1t}, z_{2t}, \ldots, z_{Lt})^T$ corresponding to the vector of covariates at time t and $\gamma = (\gamma_1, \gamma_2, \ldots, \gamma_L)^T$ being their corresponding coefficients.

In some embodiments, the temporal module 122 may be configured to adjust one or more sets of model parameters based, at least in part, on determined model residuals. The adjusting (i.e., hybridizing) is configured to capture nonlinearities in the wind farm data. In one nonlimiting example, the model parameter adjustment may correspond to a support vector regression (SVR) hybridization.

Hybridization may include training and testing a machine learning model over a process of residuals, $\{\hat{\varepsilon}_{i,t}\}$, with:

$$\hat{\varepsilon}_{i,t} = X_{i,t} - \hat{X}_{i,t|t-1}, \forall t$$

from the temporal models previously fitted to each of the wind farms under consideration. $\hat{X}_{i,t|t-1}$ corresponds to a one-step-ahead predictor of the time series model given all the information up to time t−1. Once a temporal model is identified and estimated using the training data set, the temporal model's residuals may be determined and split again to conduct the SVR training and testing. In one nonlimiting example, the split may be 70% SVR training and 30% SVR testing. However, this disclosure is not limited in this regard.

In an embodiment, assuming a kernel function $\kappa(\cdot, \cdot)$ and a vector of features $\vec{\xi}_t$ (that includes lags, i.e., prior values, of $\hat{\varepsilon}_{i,t}$), the residuals of the SVR model may correspond to:

$$\hat{v}_{i,t} := \hat{\varepsilon}_{i,t} - \sum_{d=1}^{D} \hat{\psi}_d \cdot \kappa(\vec{\xi}_t, \vec{\xi}_d) - \hat{\psi}_0$$

Where $\vec{\xi}_d$ corresponds to a vector of features, $\hat{\psi}_d$ corresponds to an estimated coefficient for a d-th support vector ($d \in \{1, 2, \ldots, D\}$), and $\hat{\psi}_0$ is a (estimated) constant.

It may be appreciated that this model uses a Gaussian radial kernel function whose features correspond to selected lags for a prior 24 hour interval with a majority of features selected from a most recent 6 hour interval. Corresponding hyperparameters may be selected via a cross-validation technique. In an embodiment, the hybridization technique may be applied to a selected temporal model for each wind farm. The temporal model may be selected based, at least in part, on validation results, as described herein.

Thus, one of more of the temporal models included in Table 1 may be fit to the respective training data set of each wind farm under consideration. In some embodiments, the fitted models may be complemented by a formal model of a corresponding residual process. In one nonlimiting example, the formal model may correspond to SVR resulting in a hybridized model. Spatial features may then be estimated based, at least in part, on the temporal model fitting results for each wind farm included in a group of wind farms.

The spatial module 124 may then be configured to estimate a DVINE copula model based, at least in part, on residual values determined using the temporal models and the training data set. In an embodiment, the residual values correspond to model residual values (i.e., $\hat{\varepsilon}_{i,t}$) associated with fitted temporal models. In another embodiment, the residual values correspond to the hybridized (e.g., resulting from the SVR operations) residual values (i.e., $\hat{v}_{i,t}$) from the fitted temporal models.

Estimating the copula model includes modeling marginal probability distributions of each variable and then using the fitted distribution to transform the data using a probability integral transformation (PIT) as (for the hybridized residuals):

$$\hat{u}_{i,t} = \hat{F}_{i,\hat{\theta}_{M_i}}(\hat{v}_{i,t})$$

or, for the temporal model residuals that have not been hybridized, as:

$$\hat{u}_{i,t} = \hat{F}_{i,\hat{\theta}_{M_i}}(\hat{\varepsilon}_{i,t})$$

$\hat{F}_{i,\hat{\theta}_{M_i}}$ may then correspond to a fitted parametric distribution function parameterized by $\hat{\theta}_{M_i}$, or an empirical distribution function.

An s-dimensional VINE copula model may generally be represented in terms of a set of s−1 minimum spanning trees with nodes representing variables and links representing (un)conditional bivariate distributions. A spanning tree is a collection of links without loops, connecting all the nodes together. To determine a minimum spanning tree, a cost is associated to each one of the links and an objective is to find a spanning tree such that the summation of the costs of the links used is minimized. DVINE models rely on the specification of the first minimum spanning tree as a linear one (all nodes with at most two link connections) since the higher order structures may be determined from the first tree. In general, the joint probability density of the original random vector is equivalent to the product of the (un) conditional bivariate copula densities located in the links and the marginal densities.

DVINE models rely on the specification of the $\hat{u}_{i,t}$ variables' location in the first level as a Hamiltonian path, i.e., as a degree-constrained spanning tree in which all the nodes have a degree of at most two (at most two links coming out of them). This constraint results in a linear spanning tree with two extremes. Generally, each variable should be located close to those that are strongly correlated to it.

Each link in the chosen tree represents the bivariate distribution of the two variables in the nodes connected by the link considered. Once the tree structure is determined, the spatial module 124 may be configured to fit a bivariate copula model for each one of the links. First, an independence test is conducted based on an asymptotic distribution of the sample Kendall's Tau. If the hypothesis of independence is rejected, a copula model is chosen, so that the AIC (Akaike Information Criterion) is minimized.

Subsequent s−2 trees may then be determined systematically from the first tree by defining a node to represent, as a variable, each link in the previous tree; while maintaining the linear geometry to connect the nodes. Each one of the new links may then represent a conditional bivariate distribution whose conditioning elements are the common variables in the two nodes connected. The non-common variables (i.e., two) are the variables being modeled in the conditional distribution. The variables involved in the copula model (for the hybridized residuals) may then be determined as:

$$\hat{u}_{k,t|S} := \hat{F}_{k|S}(\hat{v}_{k,t} \mid \{\hat{v}_{i,t}\}_{i \in S}) = \frac{\partial C_{kj|S_{-j}}\left(\hat{u}_{k,t|S_{-j}}, \hat{u}_{j,t|S_{-j}}\right)}{\partial u_{j,t|S_{-j}}} \text{ with}$$

$$\hat{u}_{\cdot,t|S_{-j}} := \hat{F}_{\cdot|S_{-j}}(\hat{v}_{\cdot,t} \mid \{\hat{v}_{i,t}\}_{i \in S\setminus\{j\}})$$

where $\hat{F}_{k|S}$ corresponds to an estimated conditional distribution function of $\hat{v}_{k,t}$ (or $\hat{\varepsilon}_{k,t}$) given the variables $\{v_{i,t}\}_{i \in S}$ (or $\{\varepsilon_{i,t}\}_{i \in S}$). S corresponds to a set of indices configured to determine which variables to condition on. If S=Ø, an unconditional distribution is defined, otherwise a conditional distribution may be defined with $j \in S$, $S_{-j}:=S\setminus\{j\}$. $C_{kj|S_{-j}}(\bullet,\bullet)$ corresponds to a copula model determined in a previous tree. The variables involved in the copula model for the unhybridized residuals may be similarly determined with $\hat{\varepsilon}_{i,t}$ substituted for $\hat{v}_{i,t}$ in the equations for $\hat{u}_{k,t|S}$ and $\hat{u}_{\cdot,t|S_{-j}}$.

At least a portion of the bivariate copula models distributed along the s−1 tree structures may be selected and estimated. A majority of the co-dependence structure may be relatively well explained in a first portion of the trees. The parameters for the pair-wise models may then be jointly estimated by a standard maximum likelihood technique.

Thus, selecting a suitable spatio-temporal structure for a number, s, wind farms includes selection of an appropriate temporal model for each wind farm individually (i.e., "marginal"). The temporal model may be hybridized or unhybridized, as described herein. An appropriate spatial structure may then be selected based, at least in part, on the residuals derived from the temporal models over a plurality of wind farms (i.e., a group of wind farms). The word "appropriate" in this context corresponds to a best option based on the criteria considered (e.g., calibration (e.g., probabilistic, exceedance, marginal), sharpness, etc.).

The spatio-temporal model(s) may then be validated. In other words, the spatio-temporal models have been estimated using the training portion of the acquired wind farm data. Testing, i.e., validation, may then be performed using the testing portion of the wind farm data. In an embodiment, validation module 126 is configured to generate an ensemble of probabilistic forecasts based, at least in part, on the estimated spatio-temporal models. The validation module 126 is then configured to determine a set of residuals for each forecast horizon. The determining may be based, at least in part, on a resampling from the copula model. In one nonlimiting example, the resampling may be performed 1000 times. However, this disclosure is not limited in this regard. The probabilistic prediction of wind power output may then be determined by combining a mean temporal prediction with a copula residual simulated sample to form an ensemble forecast of wind power. An inverse-logit transformation may be applied to form the ensemble forecast for transformed models. Thus, a simulation of 1,000 (for example) possible outcomes from the predictive density of interest may be provided.

The wind power data was split into a training portion, and a testing portion, as described herein. The training portion is configured to be used for identifying and calibrating the spatio-temporal models and the testing portion is configured to be used for evaluating the predictive accuracy of the proposed models. In an embodiment, the validation module 126 is configured to implement testing operations on a rolling basis (or rolling-origin update). The rolling basis (or rolling origin update) is configured to account for a natural temporal ordering, nonstationary dynamics and correlation of the wind farm data. Starting with data points included the training portion, each trained model may be used to predict wind power output at hourly intervals, over a 24-hour horizon (ω=24). The results may then be compared to the actual wind power output data for the same period. The 24-hour actual wind power output data may then be incorporated in the training portion to update the series of residuals. The validation module 126 may be configured to repeat the predicting, comparing and updating over the entire testing portion. The repeating is configured to emulate a 24-hour horizon planning effort common in the electricity market.

Generally, validation operations are configured to compare the predictive densities (e.g., an ensemble forecast) to the observed patterns of the testing observations (i.e., actual data). Calibration and sharpness are the main characteristics that the probabilistic forecasts should exhibit. Calibration (sometimes referred to as reliability) corresponds to the asymptotic compatibility of the sequence of fitted distributions and corresponding actual distributions. Sharpness is a measure of the spread in the predicted distribution. A sufficiently calibrated forecast resembles the original distribution of the data in terms of sharpness.

Validation techniques may include univariate validation and multivariate validation. An objective of univariate validation is to establish the quality of the model in a marginal context, i.e., for each farm individually. The multivariate validation is configured to assess the quality of the joint forecasts for all the wind farms within a group for a given time instant. Calibration types associated with univariate validation may include, but are not limited to, probabilistic, exceedance, and marginal.

The calibration check may be performed graphically using a histogram and/or mathematically using bin value ranges that correspond to the histogram. 95%-confidence bands may be included in the histograms used for calibration. The confidence bands may be constructed using the central limit theorem and are configured to express the possible values each histogram height might take without providing evidence against uniformity. It is assumed that each one of these trials are independent from each other, thus creating a binomially-distributed experiment.

Probabilistic calibration may be performed using a probability integral transformation (PIT). The validation module 126 may be configured to determine a corresponding PIT for each observed value with respect to a corresponding predicted distribution. A histogram for the PIT transformed variables may then be evaluated. A PIT histogram that resembles the histogram of a uniform distribution may then indicate that the model is probabilistically calibrated. To avoid correlation among the PIT variables when rolling updates, the h-step-ahead forecasts (with h fixed) may be derived from different training limits.

Exceedance and/or marginal calibration may then be performed. To assess both exceedance and marginal calibration, a sequence of indicator variables may be written as:

$$I_{i,\tilde{T},h,\alpha} := \mathbb{I}_{(X_{i,\tilde{T}+h} \leq q_{\alpha,\tilde{T},h} | \Im \tilde{T})}$$

where $X_{i,\tilde{T}+h}$ represents the variable of interest h steps ahead of the training limit $\tilde{T}$, $q_{\alpha,\tilde{T},h}$ corresponds to the a-quantile of the corresponding predictive distribution and represents all the information available up to time. The indicator may take the value of one if the condition is satisfied, otherwise it takes the value of zero. If the forecasting mechanism is calibrated, then:

$$\mathbb{E}\,[I_{i,\hat{T},h,\alpha}]=a;\forall \hat{T},i,h$$

with $\mathbb{E}\,[\bullet]$ being the expectation operator. For a sequence of $\alpha$ values ($\alpha \in \{0.1, 0.2, \ldots, 0.9\}$), the average of the indicator variables over all training limits for a specific time horizon h, $$\bar{I}_{i,h,\alpha} := \frac{avg(I_{i,\hat{T},h,\alpha})}{\forall \hat{T}},$$

with avg(•) denoting the average or sample mean for all training limits, may be determined. The corresponding sequence of averages as a function of h and $\alpha$, for each site i as well as their corresponding confidence bands may then be analyzed.

The continuous-ranked probability score (CRPS) considers both calibration and sharpness simultaneously and is configured to provide a quantitative measure for a deviation between a forecast and a corresponding observed value. A relatively lower CRPS value corresponds to a relatively higher quality predictive density. For an ensemble forecast, an average of all the CRPS values for each time horizon, h, may be determined and the sequence of averages as a function of h may be determined for each wind farm.

Validation module 126 may then be configured to perform multivariate validation. A multivariate forecast corresponds to a vector of univariate forecasts for a group of wind farms at a particular instant in time. In one example, the group of wind farms may be geographically relatively close. In another example, the group of wind farms may not be geographically relatively close.

Calibration may be assessed as a whole for multivariate forecasts and may be based, at least in part, on pre-rank functions. The pre-rank functions may include, but are not limited to, minimum spanning tree (MST) and band-depth (BD). Both are sensitive to model misspecifications. The MST pre-rank function is configured to assign as pre-rank for each element, $u \in Y_{\hat{T}+h}$, the length of the minimum spanning tree over the set of elements in $Y_{\hat{T}+h}\backslash\{u\}$. The BD pre-rank function is configured to translate band-depth from functional data analysis to the probabilistic forecasting arena by measuring the centrality depth indicator for element u among the elements of $Y_{\hat{T}+h}$. The centrality depth indicator generally corresponds to a proportion of components of u that fall inside bands defined by pairs of elements extracted from $Y_{\hat{T}+h}$.

An energy score (ES) corresponds to a generalization of the CRPS using a Euclidean norm. Similar to CRPS, an average of the ES values for each time horizon, h, may be determined and the sequence of averages as a function of h may be determined for each wind farm.

Thus, univariate validation techniques may include, but are not limited to, PIT, probabilistic calibration, exceedance calibration, marginal calibration, and determining CRPS. Multivariate validation techniques may include, but are not limited to, evaluating a pre-rank function (e.g., MST and/or BD) and determining ES.

Validation module 126 may thus be configured to perform validation operations, as described herein, for each model under consideration. Validation module 126 may then be configured to compare the validation results for the models and to select a model based, at least in part, on the comparison results. For example, a relatively better model may have a PIT that is relatively closest to a uniformity histogram. In another example, a relatively better model may exhibit approximately constant behavior over a range of forecast horizon values. In another example, a relatively better model may have a CRPS and/or ES that is/are a minimum relative to other models for a forecast horizon of interest. An identifier corresponding to the selected model and its associated predictive densities may then be output.

Thus, an apparatus, method and/or system, according to the present disclosure, are configured to fit a plurality of temporal models to at least a portion of wind farm data for each wind farm. The forecasting method and/or system are then configured to fit a spatial model (e.g., drawable vine ("DVINE") structure) based, at least in part, on residuals from the temporal model fitting. The spatio-temporal models may then be validated for each wind farm. At least one respective spatio-temporal model may be selected for each wind farm based, at least in part, on the validation results. The selected spatio-temporal model may then be utilized to predict a wind power output for selected forecast horizon.

Figure 2:
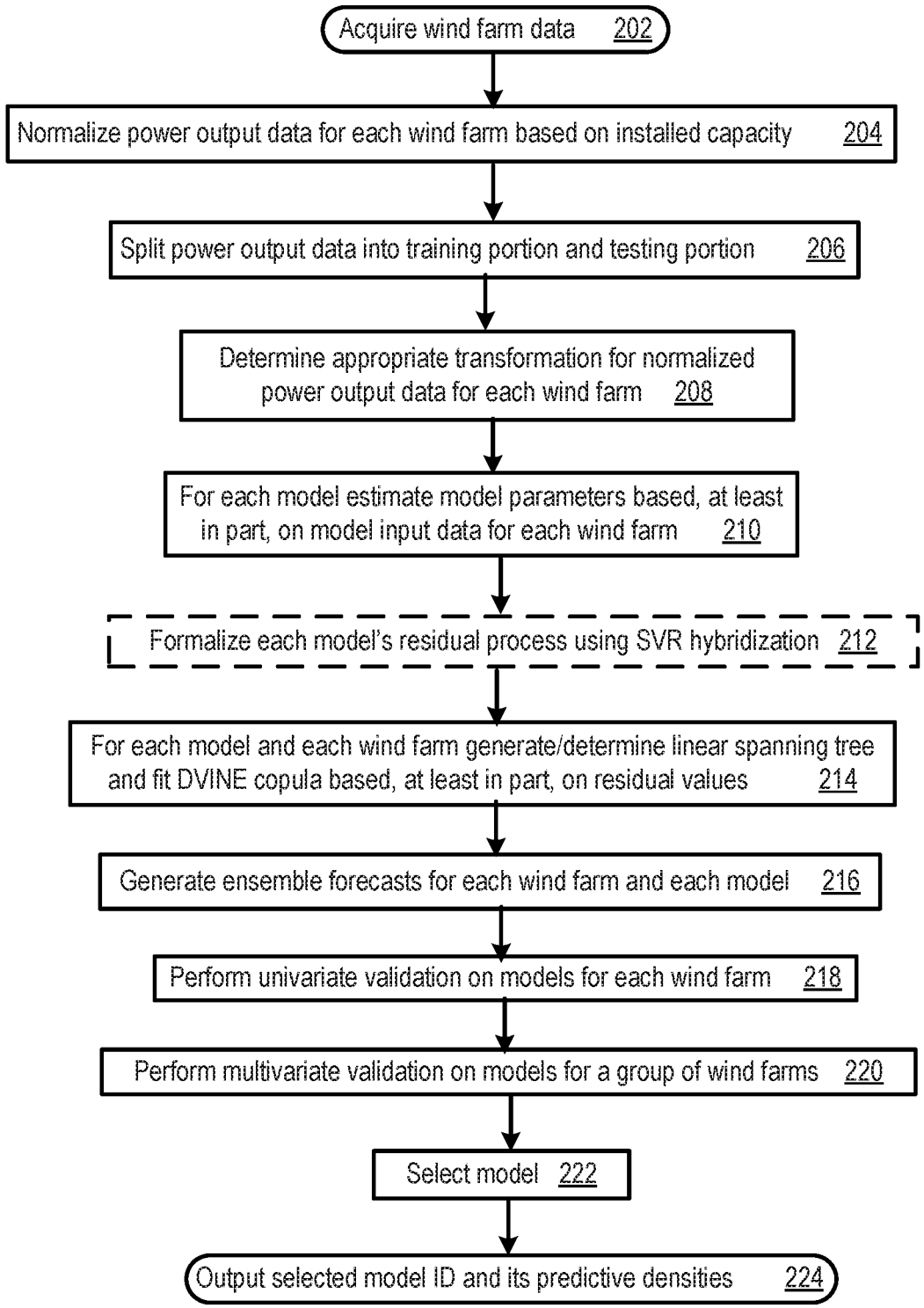
FIG. 2 is a flowchart of spatio-temporal probabilistic forecasting operations according to various embodiments of the present disclosure.

FIG. 2 is a flowchart 200 of spatio-temporal probabilistic forecasting operations according to various embodiments of the present disclosure. In particular, the flowchart 200 illustrates fitting and validating spatio-temporal model(s) for at least one wind farm. The operations may be performed, for example, by the spatio-temporal probabilistic wind power output forecasting system 100 (e.g., preprocessor module 120, temporal module 122, spatial module 124 and/or validation module 126) of FIG. 1.

Operations of this embodiment may begin with acquiring wind farm data at operation 202. Operation 204 includes normalizing power output data for each wind farm based on installed capacity. Operation 206 includes splitting power output data into a training portion and a testing portion. An appropriate transformation for normalized power output data bay be determined for each wind farm at operation 208. It may be appreciated that, in some situations, the appropriate transformation may be no transformation. For each model, model parameters may be estimated based, at least in part, on model input data for each wind farm at operation 210.

In some embodiments, each model's residual process may be formalized using SVR hybridization at operation 212. For each model and each wind farm, a linear spanning tree may be generated/determined and a DVINE copula may be fit based, at least in part, on residual values at operation 214.

Ensemble forecasts may be generated for each wind farm and each model at operation 216. Univariate validation may be performed on the models for each wind farm based, at least in part, on the testing portion at operation 218. Multivariate validation may be performed on the models for a group of wind farms based, at least in part, on testing portion at operation 220.

A model may be selected at operation 222. The selected model ID and its predictive densities may be output at operation 224.

Thus, a spatio-temporal model may be estimated and validated for at least one wind farm.

In the foregoing, power output forecasting is described with respect to wind farm(s). However, it is contemplated that such techniques may be applied to other forms of renewable energy power output forecasting, within the scope of the present disclosure. Other forms of renewable energy may include, but are not limited to, solar, hydro, geothermal, tidal, etc.

As used in any embodiment herein, the terms "logic" and/or "module" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry", as used in any embodiment herein, may include, for example, singly or in any combination, hard-wired circuitry, programmable circuitry such as computer processors comprising one or more individual instruction processing cores, state machine circuitry, and/or firmware that stores instructions executed by programmable circuitry. The logic and/or module may, collectively or individually, be embodied as circuitry that forms part of a larger system, for example, an integrated circuit (IC), an application-specific integrated circuit (ASIC), a system on-chip (SoC), desktop computers, laptop computers, tablet computers, servers, smart phones, etc.

Memory 112 may include one or more of the following types of memory: semiconductor firmware memory, programmable memory, non-volatile memory, read only memory, electrically programmable memory, random access memory, flash memory, magnetic disk memory, and/or optical disk memory. Either additionally or alternatively system memory may include other and/or later-developed types of computer-readable memory.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. A method for forecasting wind power output of a target wind farm, the method comprising:

normalizing, by a preprocessor module, wind power output data for each wind farm of a group of wind farms, based, at least in part, on a respective installed capacity;

transforming, by a temporal module, the normalized wind power output data to yield transformed normalized wind power output data;

fitting, by the temporal module, each temporal model of at least one temporal model to model input data for each wind farm, the model input data corresponding to normalized wind power output data or transformed normalized wind power output data;

fitting, by a spatial module, a DVINE copula model for the group of wind farms, based, at least in part, on at least one residual value, each residual value determined based, at least in part on a selected fitted temporal model for each wind farm in the group;

validating, by a validation module, each model of the at least one model, the validating comprising at least one of a univariate validation technique and a multivariate validation technique;

selecting, by the validation module, at least one selected temporal model based, at least in part, on a comparison of validation results; and predicting a wind power output for the target wind farm utilizing the selected model.

2. The method of claim 1, further comprising adjusting, by the temporal module, at least one model parameter based, at least in part, on a model residual and based, at least in part on a support vector regression (SVR) hybridization.

3. The method of claim 1, wherein the temporal model is selected from the group comprising Naïve—ARIMAX, Transformed ARIMAX, Transformed dynamic autoregressive (AR), quantile AR, dummy and persistence, the ARIMAX models corresponding to an autoregressive integrated moving average and comprising an additive cyclic feature and the transformed models corresponding to application of a $\upsilon$-logit transform.

4. The method of claim 1, wherein the univariate validation technique is selected from the group comprising a probability integral transformation, an exceedance calibration, a marginal calibration, a continuous-ranked probability score and the multivariate validation technique is selected from the group comprising evaluating a pre-rank function and determining an energy score.

5. The method according to claim 1, further comprising acquiring, by the preprocessor module, wind farm data, the wind farm data comprising the power output data, geographic location data, and weather data, the weather data comprising one or more of wind direction, wind speed, air temperature, air density and air pressure.

6. A wind power output forecasting system for a target wind farm, the system comprising:

a preprocessor module configured to normalize wind power output data for each wind farm of a group of wind farms, based, at least in part, on a respective installed capacity;

a temporal module configured to transform the normalized wind power output data to yield transformed normalized wind power output data and to fit each temporal model of at least one temporal model to model input data for each wind farm, the model input data corresponding to normalized wind power output data or transformed normalized wind power output data;

a spatial module configured to fit a DVINE copula model for the group of wind farms, based, at least in part, on at least one residual value, each residual value determined based, at least in part on a selected fitted temporal model for each wind farm in the group; and a validation module configured to validate each model of the at least one model, the validating comprising at least one of a univariate validation technique and a multivariate validation technique, configured to select at least one selected temporal model based, at least in part, on a comparison of validation results, and configured to predict a wind power output for the target wind farm utilizing the selected model.

7. The system of claim 6, wherein the temporal module is further configured to adjust at least one model parameter based, at least in part, on a model residual and based, at least in part on a support vector regression (SVR) hybridization.

8. The system of claim 6, wherein the temporal model is selected from the group comprising Naïve—ARIMAX, Transformed ARIMAX, Transformed dynamic autoregressive (AR), quantile AR, dummy and persistence, the ARIMAX models corresponding to an autoregressive integrated moving average and comprising an additive cyclic feature and the transformed models corresponding to application of a υ-logit transform.

9. The system according to claim 6, wherein the univariate validation technique is selected from the group comprising a probability integral transformation, an exceedance calibration, a marginal calibration, a continuous-ranked probability score and the multivariate validation technique is selected from the group comprising evaluating a pre-rank function and determining an energy score.

10. The system of claim 6, wherein the preprocessor module is further configured to acquire wind farm data, the wind farm data comprising the power output data, geographic location data, and weather data, the weather data comprising one or more of wind direction, wind speed, air temperature, air density and air pressure.

11. A computer readable storage device having stored thereon instructions that when executed by one or more processors result in the following operations comprising:
    normalizing wind power output data for each wind farm of a group of wind farms, based, at least in part, on a respective installed capacity;
    transforming the normalized wind power output data to yield transformed normalized wind power output data;
    fitting each temporal model of at least one temporal model to model input data for each wind farm, the model input data corresponding to normalized wind power output data or transformed normalized wind power output data;
    fitting a DVINE copula model for the group of wind farms, based, at least in part, on at least one residual value, each residual value determined based, at least in part on a selected fitted temporal model for each wind farm in the group;
    validating each model of the at least one model, the validating comprising at least one of a univariate validation technique and a multivariate validation technique;
    selecting at least one selected temporal model based, at least in part, on a comparison of validation results; and
    predicting a wind power output for a target wind farm from the group of wind farms utilizing the selected model.

12. The device of claim 11, wherein the instructions that when executed by one or more processors result in the following additional operations comprising: adjusting at least one model parameter based, at least in part, on a model residual and based, at least in part on a support vector regression (SVR) hybridization.

13. The device of claim 11, wherein the temporal model is selected from the group comprising Naïve—ARIMAX, Transformed ARIMAX, Transformed dynamic autoregressive (AR), quantile AR, dummy and persistence, the ARIMAX models corresponding to an autoregressive integrated moving average and comprising an additive cyclic feature and the transformed models corresponding to application of a υ-logit transform.

14. The device of claim 11, wherein the univariate validation technique is selected from the group comprising a probability integral transformation, an exceedance calibration, a marginal calibration, a continuous-ranked probability score and the multivariate validation technique is selected from the group comprising evaluating a pre-rank function and determining an energy score.

15. The device of claim 11, wherein the instructions that when executed by one or more processors result in the following additional operations comprising: acquiring wind farm data, the wind farm data comprising the power output data, geographic location data, and weather data, the weather data comprising one or more of wind direction, wind speed, air temperature, air density and air pressure.

\* \* \* \* \*